United States Patent
Sarrach et al.

(10) Patent No.: US 6,588,563 B1
(45) Date of Patent: Jul. 8, 2003

(54) ASSEMBLY AND REALISATION OF SYNCHRONISATION RINGS IN THE FORM OF SHEET METAL PARTS SHAPED WITHOUT CUTTING

(75) Inventors: Roland Sarrach, Röttenbach (DE); Reiner Martin, Pommersfelden (DE); Josef Schwuger, Höchstadt (DE); Rudolf Sinner, Bubenreuth (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 09/856,671
(22) PCT Filed: Sep. 18, 1999
(86) PCT No.: PCT/EP99/06935
§ 371 (c)(1),
(2), (4) Date: Aug. 24, 2001
(87) PCT Pub. No.: WO00/31429
PCT Pub. Date: Jun. 2, 2000

(30) Foreign Application Priority Data

Nov. 23, 1998 (DE) .......................................... 198 53 896

(51) Int. Cl.[7] .............................................. F16D 23/06
(52) U.S. Cl. ..................... 192/53.34; 74/339; 192/53.32
(58) Field of Search ................... 192/53.34, 53.32, 192/53.341, 53.342, 53.343, 107 M; 74/339

(56) References Cited

U.S. PATENT DOCUMENTS

| | | | |
|---|---|---|---|
| 5,113,986 A | * | 5/1992 | Frost ....................... 192/53.341 |
| 5,657,844 A | * | 8/1997 | Wagner ..................... 192/53.32 |
| 5,788,036 A | * | 8/1998 | Soffa et al. ............... 192/110 R |
| 6,158,561 A | * | 12/2000 | Sakai et al. ............. 192/107 M |

FOREIGN PATENT DOCUMENTS

| | | |
|---|---|---|
| DE | 2722103 | 12/1977 |
| DE | 3412779 C1 | 11/1985 |
| DE | 19713304 A1 | 10/1998 |
| EP | 0717212 A1 | 11/1995 |
| EP | 0821175 A1 | 7/1997 |

* cited by examiner

Primary Examiner—Rodney H. Bonck
Assistant Examiner—Dennis Abdelnour
(74) Attorney, Agent, or Firm—Volpe and Koenig, P.C.

(57) ABSTRACT

An arrangement of non-machined sheet metal synchronizer rings (1, 6, 10, 18, 19, 21) is provided, the outer synchronizer rings (1, 6, 10, 19) of which are provided a radial, outwardly projecting gear ring and a radial, outwardly directed flange (3).

14 Claims, 5 Drawing Sheets

ASSEMBLY AND REALISATION OF SYNCHRONISATION RINGS IN THE FORM OF SHEET METAL PARTS SHAPED WITHOUT CUTTING

BACKGROUND

The invention concerns a synchronizing apparatus for a manual shift transmission with:

- a stationary, synchronizer body possessing torsional strength and circumferentially encompassing a gear shaft,
- a movable sleeve on the synchronizer body, slidable along the longitudinal axis of the gear shaft,
- at least one shift gear (16), rotatably placed on the gear shaft and which can be coupled to the synchronizer body (13) by the moveable sleeve (14), which gear is provided with a clutch body (17) or with a clutch gearing, and can be joined to the synchronizer body (13) by the clutch body or the clutch gearing,
- at least one friction element connected to the shift gear
- and at least one outer synchronizer ring having torsional strength connected to the synchronizer body,
- wherein the outer synchronizer ring comprises essentially a conical body,
- with that end piece thereof, of the greater diameter, being proximal to the shift gear, and that end piece thereof, of the smaller diameter, being proximal to the synchronizer body,
- which is provided on its outer surface with a gear ring directed radially outward,
- and the inner surface of which is designed as a friction surface which coacts with a friction element.

A synchronizing apparatus of this general type is described by EP 0 717 212A1. In this synchronizer apparatus, the friction element is formed by a conically designed friction ring with friction surfaces provided on both its inner and outer surfaces. These friction elements are also designated as an interposed ring and mesh with engaging cams, which project from its greater diameter end, matching with counter recesses of a clutch body. The friction surface on the outer exposed surface remains, during the synchronizing process, in a friction-locked connection with a corresponding friction surface on the outer synchronizer ring. At the same time, a friction surface, placed on the inner surface of the interposed ring, enters into a like friction connection with a friction surface of an inner synchronizer ring. The outer synchronizer ring is in a form-fit connection with the synchronizer body and engages with cams—which project radially inwardly from the lesser diameter cone end—matching recesses in the inner synchronizer ring. The inner synchronizer ring is thus, by means of the outer synchronizer ring, again in form-fit connection with the synchronizer body.

An improved ability for clutches in motor vehicle manual shift transmissions to carry greater stresses places continually growing demands on the components of the transmission. Corresponding with the greater load carrying ability of these clutches, the inertial moments to be braked in the transmission by the synchronizer rings also increase as the synchronizing proceeds. The required greater frictional forces to be produced, are generally brought about by greater frictional areas, that is, increasing the size of frictional surface pairs.

Also, as a rule, the diameter of the rings, i.e. the active width of the frictional surfaces, is increased, or, alternately, multiple synchronizing apparatuses are installed, that is, a plurality of sequential, interposed synchronizer rings are added. The entire synchronizing apparatus is thus larger, heavier and requires more space in the transmission.

Correlated to the demand for greater load capacities of synchronizing apparatuses, is a requirement that these apparatuses be of low weight and occupy a small installation space. Thus, in the design of modem synchronizing, a contradiction is created, between requirements for a higher friction capacity of synchronizing units and for their construction, sparing of both weight and installation space. Known solutions to this problem, in accord with the present state of the technology, are to be found in that the synchronizing rings are placed partially inside the allotted construction space of both the synchronizer body and the slide sleeve, and that one or more of the employed synchronizer rings is made of thin-walled, deep-drawn sheet metal.

The above references as to the state of the technology describe an arrangement, in which a deep-drawn outer synchronizer ring, a thin-walled interposed ring, and relatively massively built synchronizer ring are sequentially placed together. Theoretically, the width of this synchronizer ring arrangement would be designed only to the width of the breadth required for the friction capacity. From a practical standpoint, space requirements of elements for form-fit connection of the rings, along with their connection construction, such as matched catch and recess union, have yet to be given serious consideration.

The axial length of a synchronizing apparatus is essentially determined by the construction and the arrangement of such catches. As far as the outside width of the above embodiment in accord with the state of the technology is concerned, radially inward projecting, engaging catches of the inner synchronizer ring work disadvantageously counter to the length. Since such a synchronizer ring arrangement in a synchronizing apparatus, as a rule, is carried out twice, that is, left and right of the transverse middle plane of the synchronizer body, the required occupation of space is not a trivial matter. Sufficient axial installation space, as a rule, is available for a connection of friction rings by means of catches to the gear rings. The recesses necessary for this can be made in the convenient thick wall structure of the clutch body or the gear ring.

The outside width of a synchronizer and the weight, with which a synchronizer ring arrangement can be fitted into the synchronizer body, is essentially dependent, on how the shape-fit between the friction ring and the synchronizer body is designed. Of particular difficulty in this matter is the shaping of non-machined outer synchronizer rings, since here, besides the elements for the form-fit, also a key and detent element for a locking element of the synchronizing apparatus is to be provided and the rules of drawing mold release have to be observed, where non-machined manufacture is intended.

Particular attention is also to be given to the construction of the outer synchronizer ring. The shape of the generic type of an outer synchronizer ring is described in DE 35 19 811 C2. The axial extent of this ring is governed by the necessary thickness of its frictional surfaces. The shape-fit to neighboring components is effected by a recessed outer gear ring and by matching detents. The detents are formed from lugs, which, by being bent by other projecting tongues to the surface of the synchronizer body lie symmetrically directed. Projecting outward from that end of the ring on which the larger diameter of the conical shape is found, the aforesaid lugs point, with their free ends in the direction of the smaller diameter end of the conical ring. These lugs, during the manufacturing process and after the drawing, are stamped out of the like rim of the bowl-like object together with the gear ring and are subsequently bent. Form fitting connections, extending from the end with the smaller diameter, which match synchronizer rings of this type, can only be made by lugs, which longitudinally extend over the entire axial length of the synchronizer ring. The longer a lug is, the much more difficult it will be to exactly align the same in its proper position and place. The manufacturing demands in labor and time, and hence in fabrication costs, are increased, for instance by additional calibration. The width of such a detent acts disadvantageously to the precision of such a detent. The wider, and also the thicker the lug is made, just so much more difficult is its exact shaping.

High capacity synchronizing apparatuses encounter high torques, and very frequently, abrupt momentum peaks occur. Any lug construction must transmit such moments and peaks. The cross-sections of said lugs are correspondingly subjected to high shear and bending stresses. The lugs, on this account, must be thick in design and be made with high strength materials. Technological limits, as already mentioned, restrict the manufacture of such lugs as to their cross-section in synchronizer rings of the generic type.

Besides the increased ability for high capacity, the reduced weight, the lessening of the required installation space and the functional safety, the costs for manufacture form a further obstacle which must be taken into consideration in the design of a synchronizing apparatus. A substantial portion of the costs of the manufacture of synchronizer rings arises in that effective friction pairing must be created. Presently, conventional friction pairings are, for instance, steel-brass pairs or synchronizer rings with an extra friction coating such as sinter coating or paper coating. In the case of nonmachine manufactured synchronizer rings, the friction layers are applied in additional operations, before or after the machine-free shaping. The costs are very high for additional material, the costs of additional tooling, and additional work steps become necessary.

SUMMARY

Thus, the object of the invention is to create a design of synchronizer rings, which avoids the above mentioned disadvantages. Particular attention is directed to the formation of an outer synchronizer ring, which, without detriment to its load capacity, maintains an axial assembly space as small as possible and reduces the costs for the manufacture of synchronizer rings.

This purpose is achieved by the object of claim 1, in that the outer synchronizer ring is: of one piece, thin-walled, essentially conically shaped, and fabricated without machining. Further, on the larger diameter end thereof is located the gear ring and on the smaller diameter end thereof is a radially outwardly directed flangelike rim. This rim can be shaped from the same material which is employed in the forming of the bottom of a bowl-like shape with conical walls. This material can be, for example, stamped and turned, or folded to flange. The gear ring and, at times, also the detents are shaped from the upper rim of the conical bowl. The rim found on the smaller conical diameter of the ring and the rim on the greater conical diameter of the ring, are preferably parallel to one another and in planes transverse to the longitudinal axis of the synchronizer ring. Since the gear ring and the rim are respectively placed on the ends of the synchronizer ring, these form ideal contact surfaces. The precision of dimensioning of the fabricated end pieces is very high and, by means of a grinding procedure which follows the metal forming, can be improved still more. The inner surface of the outer synchronizer ring can be completely converted to a friction surface. The flange to flange distance of the synchronizer ring is thus exclusively governed by the necessary axial extension of the friction surface. The active size of the contact surfaces is determined by the diameter of the gear ring plus the radial extension of the gear ring and detents on one end and the outside diameter of the flange on the other end. The same measurements as those of massively designed synchronizer rings can be achieved. The advantages of a sheet metal ring shaped in this manner lie in its light weight and its low cost of fabrication.

A preferred embodiment of the invention provides, that the flange, on its outer circumference, is turned up into a collar. This collar can serve for the reinforcement of the synchronizer ring or be employed as a guide element. The collar is bent out of the material of the flange and extends with its free edge in the direction of the gear ring. A flange, even without such a collar, lends a high degree of shape stability to a synchronizer ring undergoing heat treating. This opens the way for various means of heat treating, such as penetration hardening, case hardening, nit riding and further useful processes. Additional costs for reworking, or grinding due to heat distortion of the synchronizer ring are no longer necessary. By the choice of different heat treatment procedures, different degrees of abrasion resistance can be achieved.

A flange constructed on the synchronizer ring provides the opportunity for a multiplicity of shaping possibilities dependent upon the function of the outer synchronizer ring and on the design of its neighboring components. In this way, in a further advantageous embodiment of the invention, the flange can be provided with recesses. These recesses can be brought only partially into the flange, or the flange can undergo a full cutout to the circumference. These recesses serve as guide zones for the synchronizing elements such as pressure elements for the shape-fit connection, with, for instance, the synchronizer body. Torque moments, radially directed, are transmitted through areas of extended circumferential lengths, hence, large cross-sections are called for.

Many shaping possibilities exist for contact surfaces, for instance, the contact of the sliding sleeve during presynchronizing. The flange itself can serve as a contact surface. Also, from the flange, separate detents can be created by simple metal working. An advantageous embodiment of the invention provides, that detents can be built into the toothing, which detents extend in the direction of the small cone diameter, that is pointed in the direction of the synchronizer body. Each detent lies, viewed from the axial direction, directly over a recess. As the presynchronizing proceeds, pressure elements are guided into the recesses and are fixed in this position during the presynchronizing process. These detents are made, for instance, by stamping or punching. The increment of spatial distance to the elements coacting in presynchronizing, for instance, to the pressure elements, can be determined to a very precise degree.

In the case of the outer synchronizer ring in the synchronizing apparatus, where smaller inertial moments and moment peaks are the rule, it is also possible to bring about a form-fit connection by means of catch elements, that is, connection to the inner synchronizer ring. As is described in yet another embodiment, on the smaller diameter of the cone, that is, on the smaller end of the outer synchronizer ring, are provided radially inwardly projected cams. For these cams, advantageously the material is employed, which was removed for the formation of the recesses in the flange. In this way, during the metal working, for instance, the necessary cams and therewith the recesses can be stamped out of the base. The flange is then pressed outward and the catches are bent inwardly.

The aforesaid object is further achieved, in that an outer synchronizer ring is now created which meets the specifications of being of one-piece, thin-walled and non-machined sheet metal (is, formed with chip removal) and is of the above described formulation, with an interposed ring and an inner synchronizer ring. The interposed ring and the inner synchronizer ring are likewise designed as non-machined, press formed sheet metal components. Due to the fact, that the outer synchronizer ring requires only a small space because of its radial, outwardly extending flange, the space requirement is minimal for the entire synchronizing apparatus, comprising three or more rings. Since all rings are-thin-walled, in total, they have a relatively small weight. The costs for the non-machined synchronizer rings is also relatively small. In this arrangement, the outer synchronizer ring, by means of at least one recess placed in its flange, is connected by form-fit with the synchronizer body and thus acquires torsional strength. The inner synchronizer ring is form-fit connected directly with the synchronizer body. The connection is made in an advantageous manner by an inwardly directed, radial flange on its smaller circumference, which is provided with at least one recess: The flange and the recess of this inner synchronizer ring were produced by metal forming of the draw process from the bottom of the cone shaped bowl. One may, however, consider that the form-fit connection and the prevention of twist of the inner synchronizer ring can be effected by the known, inwardly directed catches.

The already economically designed and constructed synchronizer ring arrangement can be even more economically produced, if, as is described in an advantageous embodiment of the invention, the steel surfaces of the coacting rings also form the friction surfaces of the rings. Provision also has been made, that no separate friction coating need be added. The required frictional characteristics are achieved in accord with the requirements and the application by the combination of the following variants:

The combination of assorted kinds of steel. Example: 100 Cr-6 and deep draw steel.

The combination of different surface hardenings, example: matching an unhardened friction surface against a case hardened friction surface with a friction surface of a penetration hardened ring.

The pairing of friction surfaces of different surface structures. Example: The matching of a surface that is stamped and corrugated with a smooth surface. The pairing of frictional surfaces with different ground surfaces, wherein the thereby stamped or ground corrugations can simultaneously be used for the rejection of oil.

The combination of several or all of the foregoing possibilities within a synchronizing apparatus.

Consideration can be given to the partially necessary situation that in the course of the above described friction surface combinations, the angle of the cone of the friction pairing and/or that of the frictional surfaces to one another can be modified.

BRIEF DESCRIPTIONS OF THE DRAWINGS

The invention will be described in more detail on the basis of the preferred embodiments. In the drawings shown are:

DETAILED DESCRIPTION OF THE PREFERRED EMBODIMENTS

Figure 1:
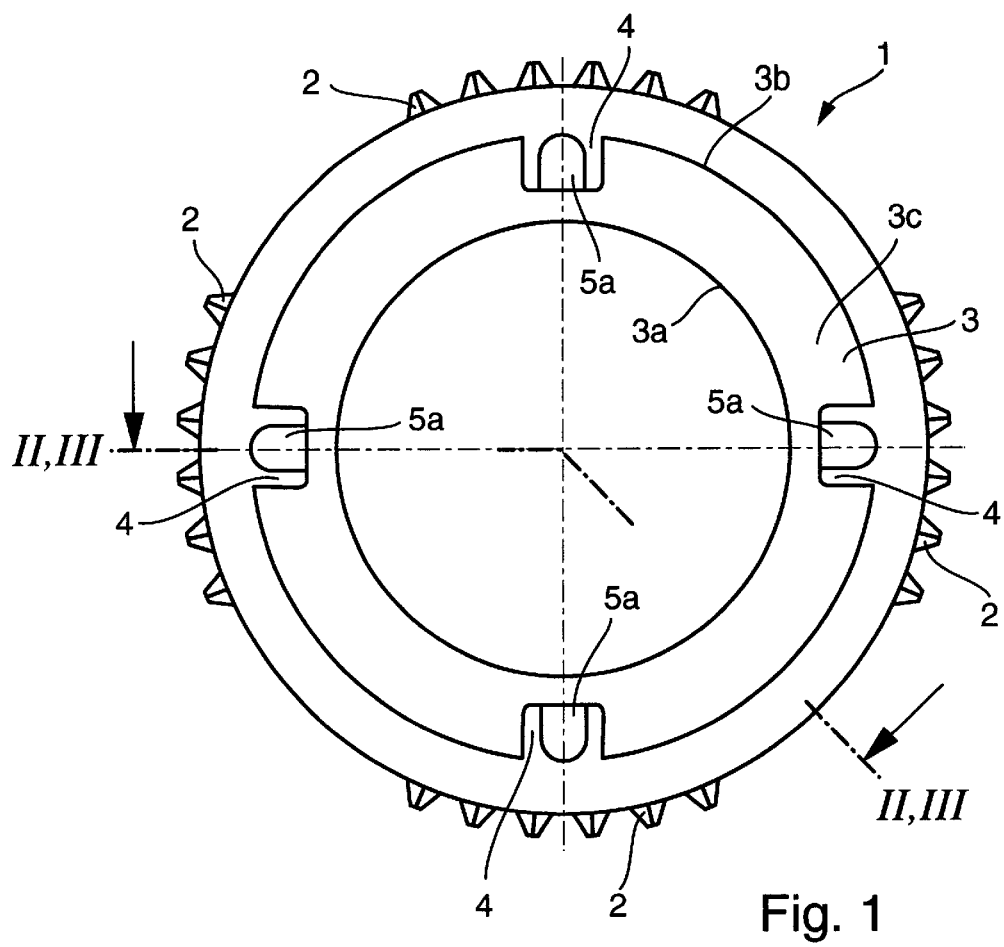
FIG. 1 is an embodiment example of an outer synchronizer ring accord with the invention with the recesses placed in the flange.
Figure 2:
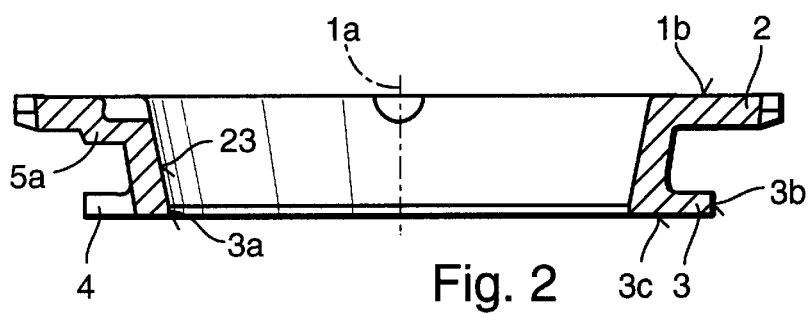
FIG. 2 is a longitudinal section through the synchronizer ring of FIG. 1, along the line II, III–II, III.
Figure 3:
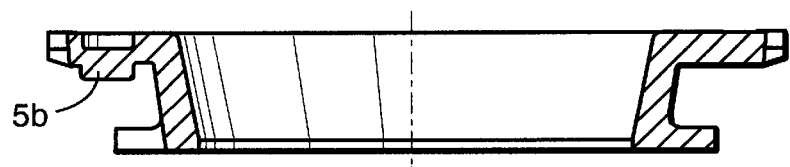
FIG. 3 is a longitudinal section through the synchronizer ring of FIG. 1, along the line II III–II, III showing an alternative embodiment to that of the sectional view shown in FIG. 2.

In FIG. 1, an outer synchronizer ring designated by 1, is shown. The outer synchronizer ring 1 is provided with a gear ring 2, a flange 3 and recesses 4 located in the flange 3. As may be seen in FIG. 2, the body of the outer synchronizer ring 1 is fabricated in a conic shape. A friction surface 23 is placed on its inner side wall. The gear ring 2 is located on that end of the outer synchronizer ring 1 with the greater conical diameter, and forms at the same time an end surface 1b. The flange 3, of the larger diameter of the cone, is aligned perpendicularly to the longitudinal central axis 1a of the outer synchronizer ring 1 and extends radially outwardly. This flange 3 forms one end surface of the outer synchronizer ring 1. At the same time, the contact surface 3c is formned, bounded by the inside diameters of said flange 3b and flange 3a, the latter having the smaller conical diameter. A stamped out detent 5a, viewed in the axial direction, lies in alignment with and opposite to the recess 4. In FIG. 3, the same cross-section through the outer synchronizer ring 1 is presented, however, now on the end surface 1b, a punched through detent 5b is provided as an alternative to the presentation according to FIG. 2.

Figure 4:
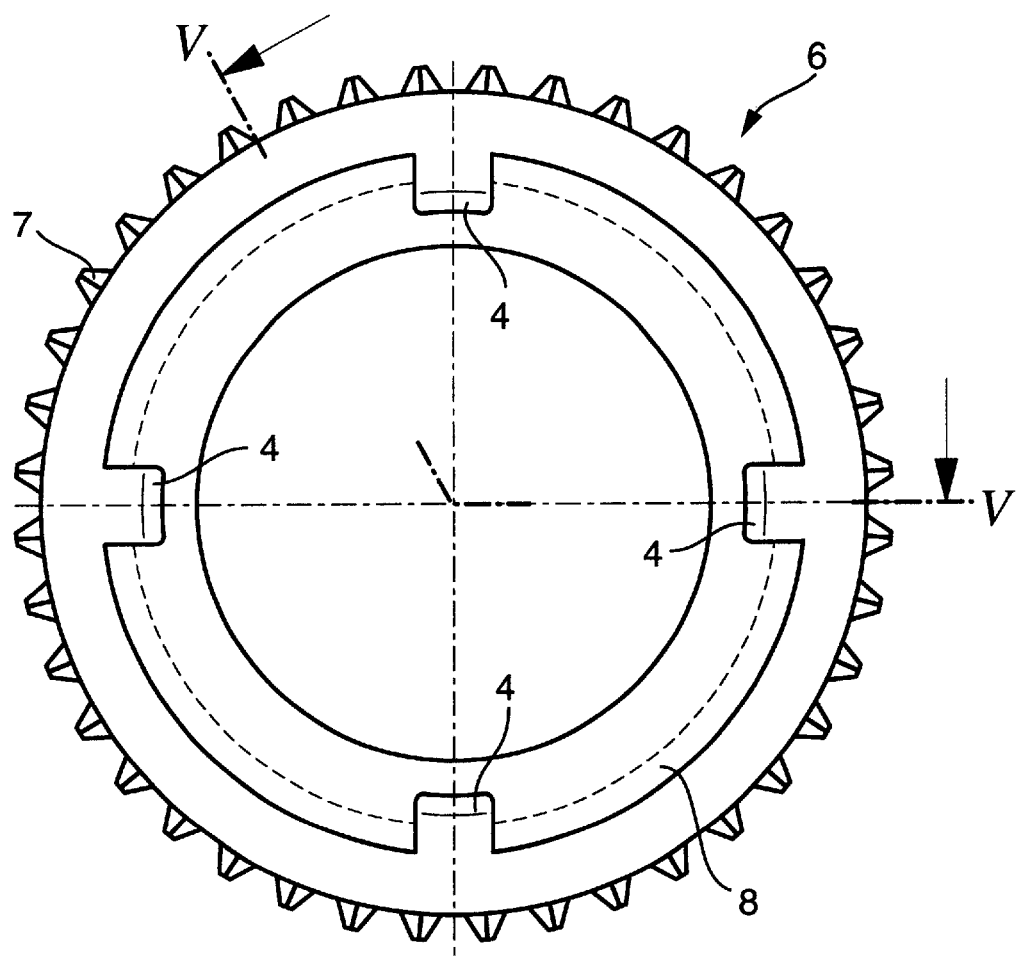
FIG. 4 is a bottom view of an embodiment of an outer synchronizer ring, the flange of which is provided with a collar and recesses.
Figure 5:
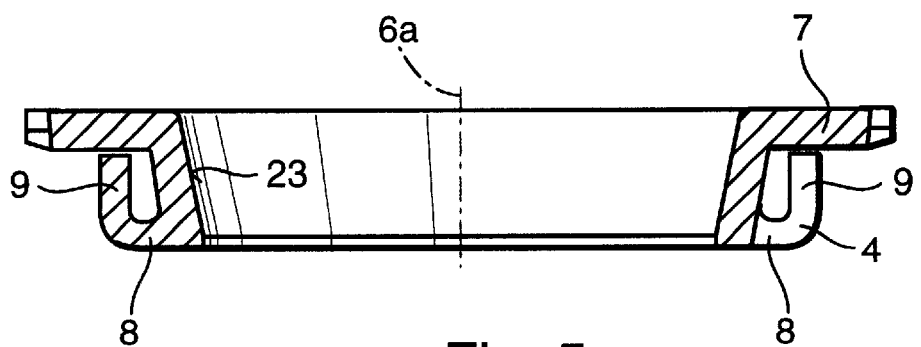
FIG. 5 is a longitudinal section through the synchronizer body in accord with FIG. 4 along the line V—V.

A further embodiment of an outer synchronizer ring 6 is shown in FIGS. 4, 5. In this embodiment, a circumferential outer gear ring 7, a flange 8 with a collar 9, and recesses 4 are provided. The collar 9 is bent parallel to the longitudinal axis 6a of the outer synchronizer ring 6, with its free end pointing in the direction of the gear ring 7.

Figure 6:
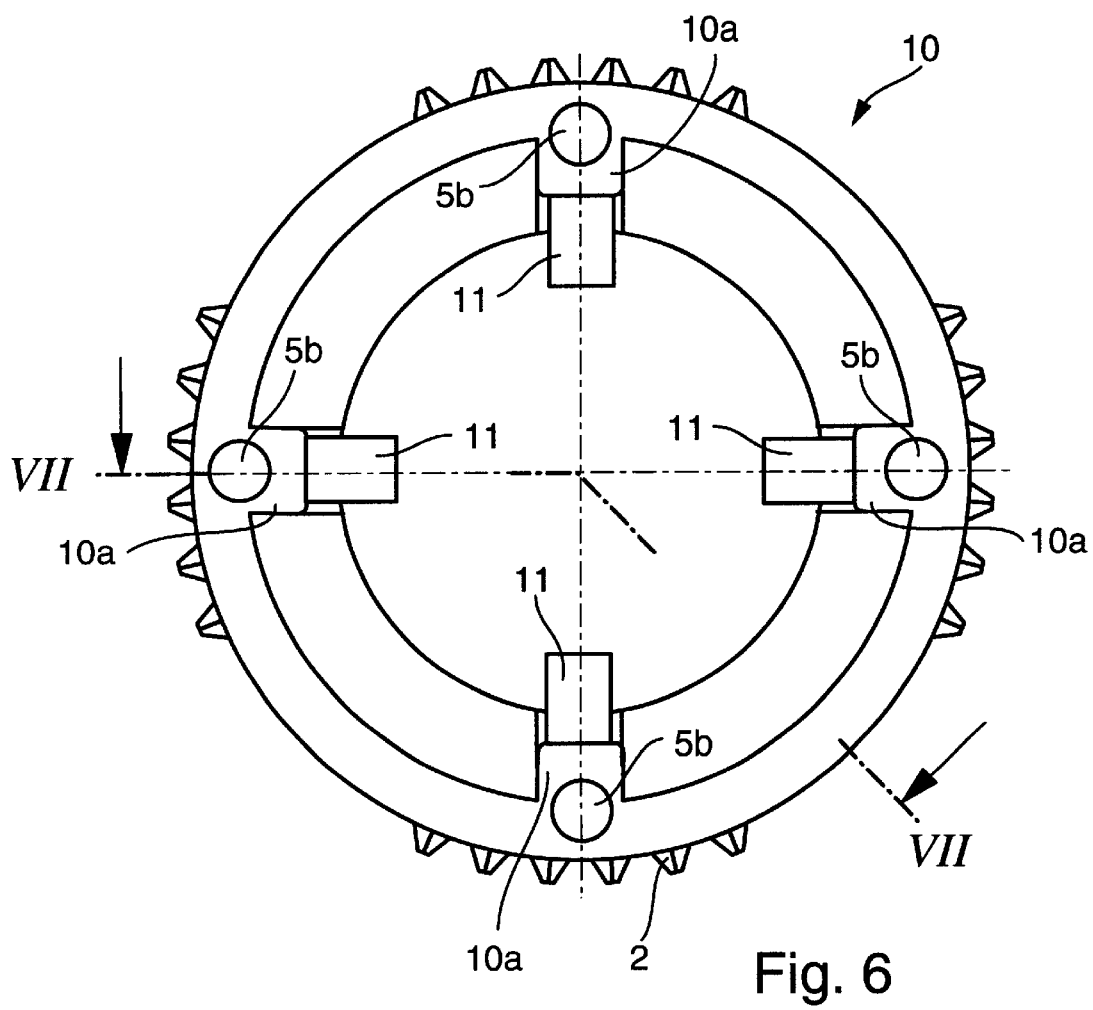
FIG. 6 is a bottom view of an embodiment of an outer synchronizer ring which is provided with a flange and inwardly directed cams.
Figure 7:
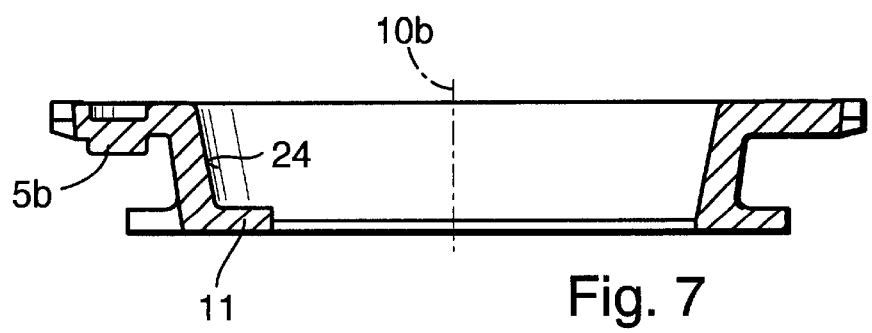
FIG. 7 is a longitudinal section through the synchronizer body of FIG. 6, along the line VII—VII.

An embodiment of an outer synchronizer ring 10 in accord with the invention with catches 11 is shown in FIG. 6. This outer synchronizer ring 10 is constructed essentially like the outer synchronizer ring 1, but, in addition to its recesses 10a, possesses inwardly projecting, radial catches 11. As can be seen from FIG. 7, the catches 11 project in a plane perpendicular to the longitudinal axis 10b of the outer synchronizer ring 10 and extend themselves inward from the friction surface 24.

Figure 8:
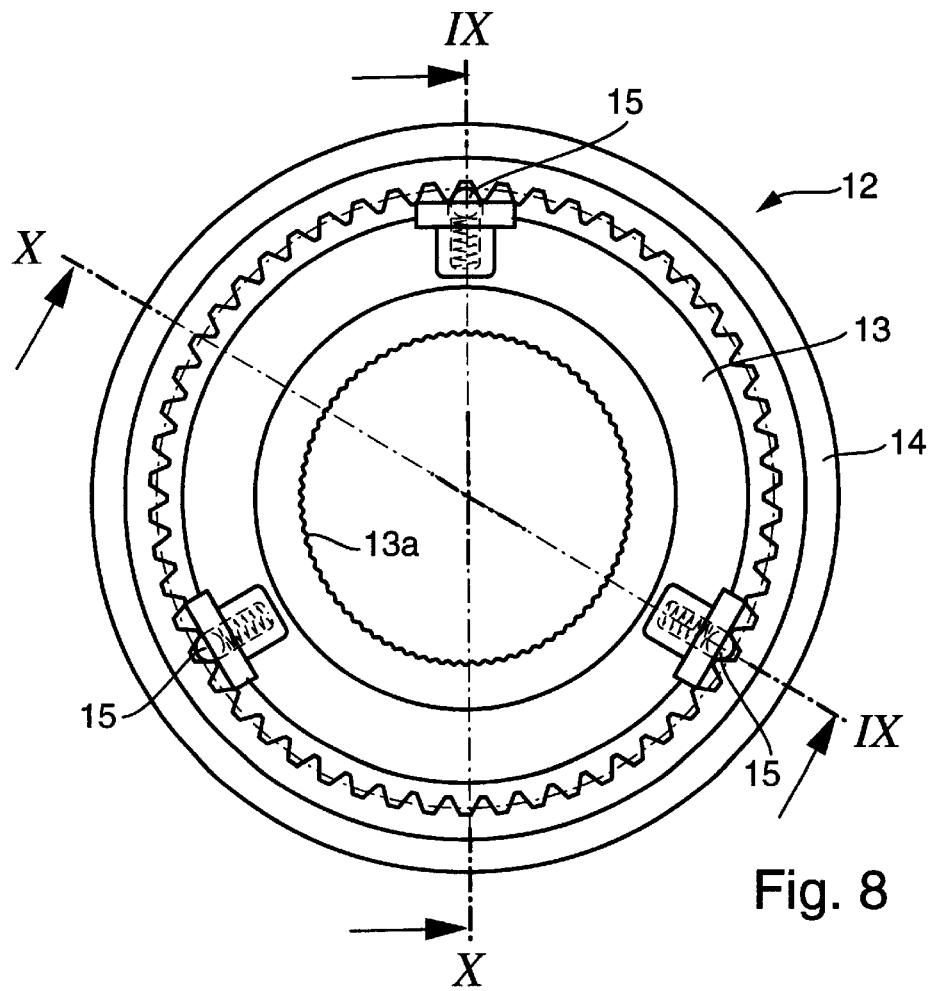
FIG. 8 is a view of an embodiment of a synchronizing apparatus with integrated pressure elements and sliding sleeves.
Figure 9:
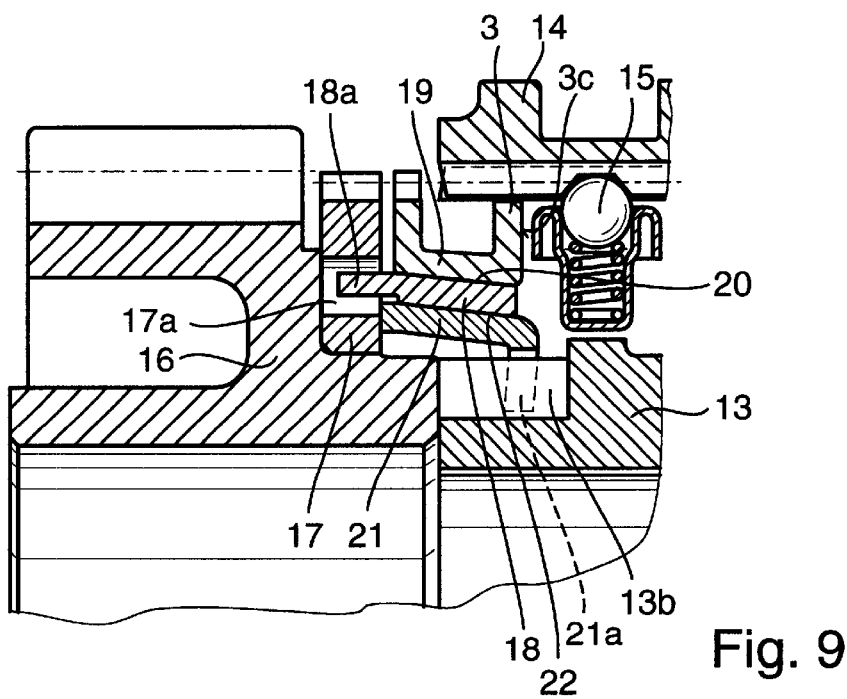
FIG. 9 is a partial view synchronizing apparatus in accordance with FIG. 8, in enlarged scale along the line IX—IX, showing an embodiment of an arrangement of synchronizer rings in accord with the drawing.
Figure 10:
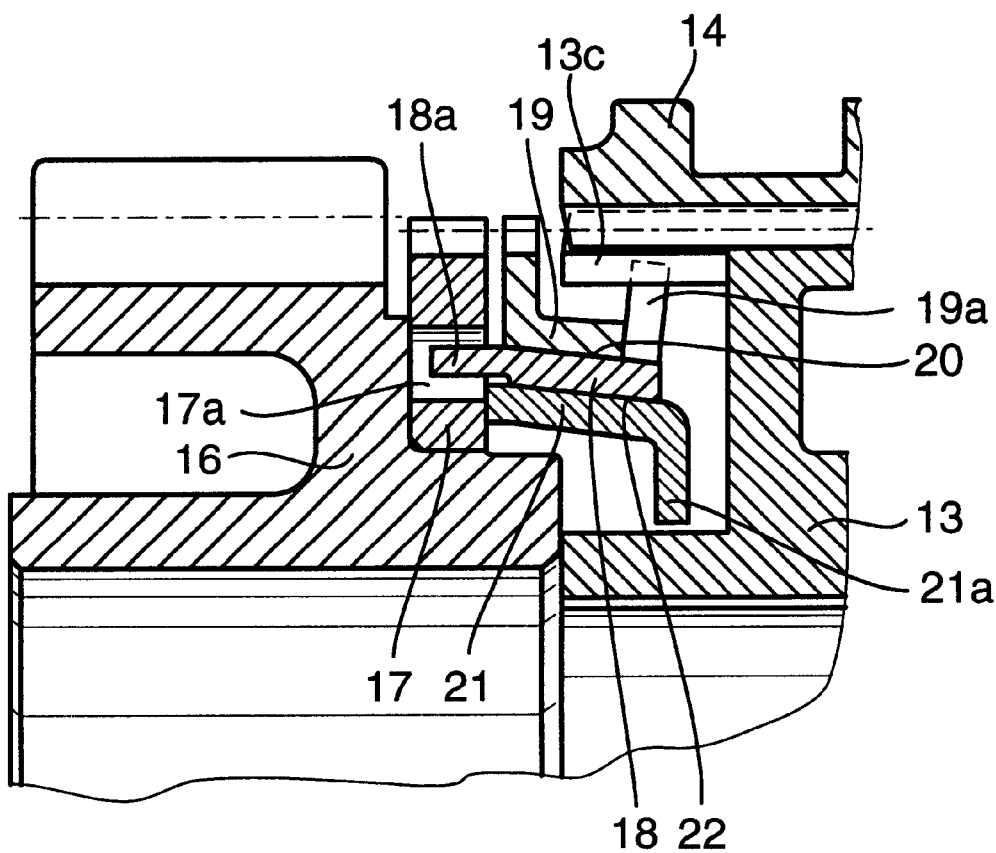
FIG. 10 is a further partial view of the synchronizing apparatus in accordance with FIG. 8, in enlarged scale, along the line X—X with the same embodiment as that in FIG. 9.

In FIGS. 8 to 10, an embodiment of an outer synchronizer ring 12 is shown, this being in particular, an embodiment of an arrangement of the inventive outer synchronizer rings. FIG. 8 shows a side view of a synchronizer body 13, upon which a slide sleeve 14 sits and into which the three pressure elements 15 are integrated. The synchronizer body 13 possesses an inner tooth gear 13a for a torque resistant arrangement with a drive shaft (not shown). The synchronizer body 13 covers, in this view an arrangement of synchronizer rings of the synchronizing apparatus 12, which, however is depicted in FIGS. 9 and 10. Adjacent to the synchronizer body 13 is placed a shift gear 16. The shift gear 16 is connected to a clutch body 17, into the recesses 17a in which catches 18a of an interposed ring 18 engage. The interposed ring 18 forms, with an outer synchronizer ring 19, a first friction pair 20 and with the inner synchronizer ring 21, a second friction pair 22. The inner flange 21a of the inner synchronizer ring 21, seen in this view, is partially covered by a shoulder 13b of the synchronizer body 13. This inner flange 21a is cut out by recesses. The shoulder 13b engages in the said recesses and thus the inner synchronizer ring 21 is form-fit with the synchronizer body 13. The pressure element 15 is moved by the sliding sleeve 14 during the pre-synchronizing against the contacting surface 3c of the flange 3 of the outer synchronizer ring 19.

The outer synchronizer ring 19 is form-fit connected with the synchronizer body 13 by its flange 3. The form fit of the outer synchronizer ring 19 with the synchronizer body 13 is effected by means of recesses 19a in its flange 3. FIG. 10 shows this form-fit connection. FIG. 10 shows a partial view of the same embodiment of a synchronizing apparatus as shown in FIG. 8 with the cross-section following the section line X—X. The flange 3 of the outer synchronizer ring 19 in this view is partially covered by an inner shoulder 13c of the synchronizer body 13. This inner shoulder 13c of the synchronizer body 13 engages in the recess 19a of the flange 3. Further, in this presentation of FIG. 10, the inner flange 21 of the inner synchronizer ring 21 is shown in an unobstructed manner.

Reference Numbers

1 Outer synchronizer ring
1a Longitudinal axis
1b End surface, larger flange
2 Gear ring
3 Flange
3a I.D. of smaller flange
3b O.D. of smaller flange
3c Contact surface
4 Recesses
5a Stamped detent in big flange
5b Stamped through detent
6 Outer Synch. Ring
6a Longitudinal axis
7 Ring gear
8 Flange, small diam.
9 Collar on 8
10 Outer Synch. Ring with catches
10a Recesses
10b Longitudinal center axis
11 Catch projections
12 Synchronizer apparatus
13 Synchronizer body
13a Inner gearing (splines)
13b Shoulder
13c Inner shoulder
14 Sliding sleeve
15 Pressure element (ball)
16 Shift gear
17 Clutch body
17a Recess
18 Interposed ring
18a Engaging catch
19 Outer Synch. ring
19a Recess
20 First friction pair
21 Inner Synch. ring
21a Inner flange
22 Second friction pair
23 Friction surface
24 Friction surface

What is claimed is:

1. A synchronizing apparatus (12) for a manual shift transmission comprising:

a stationary, synchronizer body (13) having torsional strength and circumferentially encompassing a gear shaft, a movable sleeve (14) on the synchronizer body (13), slidable along the longitudinal axis of the gear shaft, at least one shift gear (16), rotatably placed on the gear shaft and which can be coupled to the synchronizer body (13) by the moveable sleeve (14), which gear is provided with a clutch body (17) or with a clutch gearing, and can be joined to the synchronizer body (13) by the clutch body or the clutch gearing, at least one friction element connected to the shift gear (16), and at least one outer synchronizer ring (1, 6, 10, 19) having torsional strength connected to the synchronizer body, and wherein the outer synchronizer ring (1, 6, 10, 19) includes a conical annular body, with a larger diameter end thereof being proximal to the shift gear (16), and a smaller diameter end thereof being proximal to the synchronizer body (13), which is provided on an outer surface on a side with the greater diameter with a radially outwardly directed gear ring (2), an inner surface designed as a friction surface (23, 24) which coacts with a friction element, and the outer synchronizer ring (1, 6, 10, 19) is a one-piece sheet metal ring formed without chip removal, wherein the outer synchronizer ring (1, 6, 10, 19) includes on the end with the smaller diameter a radially outwardly directed flange (3, 8) constructed in one piece with the outer synchronizer ring (1, 6, 10, 19).

2. A synchronizing apparatus in accordance with claim 1, wherein the flange (8) of the synchronizer ring (6) includes on a free end thereof a collar (9) turned up in the direction of the gear ring (2).

3. A synchronizing apparatus in accordance with claim 1, wherein the torsional strength of the outer synchronizer ring (1, 6, 10, 19) is assured by at least one recess (4, 10a, 19a) in the flange.

4. A synchronizing apparatus in accordance with claim 1, wherein the flange (3) of the outer synchronizer ring (1, 6, 10, 19) includes at least one recess (4, 10a, 19a).

5. A synchronizing apparatus in accordance with claim 4, wherein the recess (4) of the outer synchronizer ring (1, 6, 10) coacts with at least one detent (5a, 5b), which projects axially in a direction of the recess (4) and is installed in the gear ring (2), and the recess (4) lies directly opposite to and is aligned with the detent (5a, 5b).

6. A synchronizing apparatus in accordance with claim 1, wherein the outer synchronizer ring (10) is made with at least one radial catch (11) on the smaller diameter end which projects inwardly from a rim of the friction surface (24).

7. A synchronizing apparatus in accordance with claim 1, wherein the outer synchronizer ring (10) is provided with at least one radially inwardly directed catch (11), projecting from a rim of the friction surface (24) at the smaller diameter end and the catch (11) is made from a metal flap which is stamped from the flange (3) and displaced to point radially inwardly.

8. A synchrorizing apparatus in accordance with the of claim 1, wherein the friction element comprises an interposed ring.(18) with an outer friction surface taperingly inclined toward a drive shaft as well as an inner friction surface taperingly inclined toward a drive shaft, the interposed ring (18) forms a first friction pairing (20) by an outer friction surface thereof contacting with the friction surface (23) of the outer synchronizer ring (1, 6, 19), and by inner friction surface coacting with an inner synchronizer ring (21), the inner synchronizer ring (21) forms with the inner friction surface of the interposed ring (18), a second friction pairing (22) by an additional outer friction surface taperingly inclined toward a drive shaft, and the inner synchronizer ring (21) connects with the synchronizer body (13), the inner synchronizer ring (21) and the interposed ring (18) are sheet metal parts formed without chip removal, and at least one recess (19a) is cut out of the flange (3) thereby increasing torsional strength.

9. A synchronizing apparatus in accordance with claim 8, wherein the inner synchronizer ring (21) is connected to the synchronizer body (13) by at least one inwardly directed radial, internal flange (21a) extending from the friction surface (24) at the smaller diameter end.

10. A synchronizing apparatus in accordance with claim 8, wherein for the manufacture of the outer synchronizer ring (1, 6, 10, 19) and the inner synchronizer ring (21) as well as the interposed ring (18), sheet steel is employed and the first friction pair (20) and the second friction pair (22) are constructed of steel.

11. A synchronizing apparatus in accordance with claim 8, wherein for the manufacture of the outer synchronizer ring (1, 6, 10, 19) and the inner synchronizer ring (21) as well as the interposed ring (18), sheet steel is employed and the first friction pair (20) and the second friction pair (22) are constructed of steel of different degrees of hardness.

12. A synchronizing apparatus in accordance with claim 8, wherein for the manufacture of the outer synchronizer ring (1, 6, 10, 19) and the inner synchronizer ring (21) as well as the interposed ring (18), sheet steel is employed and the first friction pair (20) and the second friction pair (22) are constructed of steel having a different surface structure.

13. A synchronizing apparatus in accordance with claim 8, wherein for the manufacture of the outer synchronizer ring (1, 6, 10, 19) and the inner synchronizer ring (21) as well as the interposed rings (18) sheet steel is employed and the first friction pair (20) and the second friction pair (22) are constructed of different kinds of steel.

14. A synchronizing apparatus in accordance with claim 8, wherein for the manufacture of the outer synchronizer ring (1, 6, 10, 19) and the inner synchronizer ring (21) as well as the interposed rings (18) sheet steel is employed and the first friction pair (20) and the second friction pair (22) are constructed of different kinds of steel having different degrees of hardness and different surface structure.

* * * * *